United States Patent
Hatakeda

(10) Patent No.: US 9,268,430 B2
(45) Date of Patent: Feb. 23, 2016

(54) INFORMATION PROCESSING APPARATUS, INFORMATION PROCESSING METHOD, PROGRAM, AND INFORMATION STORAGE MEDIUM

(71) Applicant: Sony Computer Entertainment Inc., Tokyo (JP)

(72) Inventor: Takashi Hatakeda, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 14/362,222

(22) PCT Filed: Dec. 6, 2012

(86) PCT No.: PCT/JP2012/081637
§ 371 (c)(1),
(2) Date: Jun. 2, 2014

(87) PCT Pub. No.: WO2013/089012
PCT Pub. Date: Jun. 20, 2013

(65) Prior Publication Data
US 2014/0354571 A1    Dec. 4, 2014

(30) Foreign Application Priority Data
Dec. 14, 2011    (JP) .................... 2011-273839

(51) Int. Cl.
*G06F 3/041* (2006.01)
*G06F 3/0488* (2013.01)

(52) U.S. Cl.
CPC ............ *G06F 3/0412* (2013.01); *G06F 3/0488* (2013.01); *G06F 3/04886* (2013.01)

(58) Field of Classification Search
CPC ..................... G06F 3/0488; G06F 3/04886
See application file for complete search history.

(56) References Cited

U.S. PATENT DOCUMENTS 5,442,373 A  *  8/1995  Nomura et al. ............... 345/104
5,534,886 A       7/1996  Nomura
(Continued)

FOREIGN PATENT DOCUMENTS

EP    2077490 A2    7/2009
EP    2098949 A2    9/2009
(Continued)

OTHER PUBLICATIONS

International Preliminary Report on Patentability and Written Opinion for corresponding PCT Application PCT/JP2012/081637, dated Jun. 26, 2014.
(Continued)

*Primary Examiner* — Kent Chang
*Assistant Examiner* — Chayce Bibbee
(74) *Attorney, Agent, or Firm* — Matthew B Dernier, Esq.

(57) ABSTRACT

If a corresponding area that is an area in a touch sensor related with an option is set larger than the size of a displayed option and corresponding areas related with different options overlap each other, any user-selected options may be properly identified. A processing execution block controls such that an option is displayed on a display block. An option identification block identifies, if a detection corresponding position that is a position in the display block related with a detected position detected by a touch sensor is inside an area in which a corresponding area that is an area including an area in which an option is displayed overlaps two or more options, any of these two or more options on the basis of a positional relation between said detection corresponding position and a corresponding area for each of these two or more options.

9 Claims, 5 Drawing Sheets

(56) References Cited

U.S. PATENT DOCUMENTS

| | | | |
|---|---|---|---|
| 5,627,567 A | 5/1997 | Davidson | |
| 2003/0222858 A1 | 12/2003 | Kobayashi | |
| 2005/0225540 A1 | 10/2005 | Kawakami | |
| 2008/0165160 A1 | 7/2008 | Kocienda | |
| 2009/0228837 A1* | 9/2009 | Suzuki et al. | 715/841 |
| 2010/0313120 A1 | 12/2010 | Ho | |
| 2011/0082620 A1 | 4/2011 | Small | |
| 2011/0181535 A1 | 7/2011 | Takayama | |
| 2011/0221693 A1 | 9/2011 | Miyazaki | |
| 2011/0285645 A1 | 11/2011 | Cho | |
| 2012/0068936 A1* | 3/2012 | Kim | 345/169 |

FOREIGN PATENT DOCUMENTS

| | | |
|---|---|---|
| JP | 1993-324174 A | 5/1993 |
| JP | 5324174 A | 12/1993 |
| JP | 2009-211663 A | 9/2009 |
| JP | 2010250695 A | 11/2010 |
| JP | 2011081797 A | 4/2011 |
| WO | 2010135132 A1 | 11/2010 |

OTHER PUBLICATIONS

International Search Report for corresponding PCT Application PCT/JP2012/081637, dated Mar. 12, 2013.

Search Report for corresponding JP Application 2013-549226, dated Jun. 30, 2015.

Search Report for corresponding EP Application 12858106.3-1507, dated Jul. 7, 2015.

* cited by examiner

INFORMATION PROCESSING APPARATUS, INFORMATION PROCESSING METHOD, PROGRAM, AND INFORMATION STORAGE MEDIUM

TECHNICAL FIELD

The present invention relates to an information processing apparatus, an information processing method, a program, and an information storage medium.

BACKGROUND ART

An information processing apparatus is known in which a touch sensor is arranged as a device for performing operation inputs.

SUMMARY

Technical Problem

For example, options displayed on a display block may become so small that it becomes inconvenient for a user to operate the options because of the necessity for arranging many options on the display block, the display block is small in size, or the like problems.

Here, it may be considered that the size of a corresponding area that is an are related with each option in a touch sensor is expanded beyond the size in which the option is displayed, thereby making it easy for the user to perform an operation for selecting each option. However, if two or more options are arranged in an overlapped manner or two or more options are arranged in proximity to each other, for example, this configuration may cause a condition in which the corresponding areas related to different options are overlapped with each other. If this condition happens, it is required to properly identify which of the two or more options has been selected by the user.

The present invention has been made in consideration of the above-mentioned problem and one of the objectives of the present invention is to allow a user to properly identify user-selected options if corresponding areas related with different options are overlapped with each other when the size of a corresponding area that is an area in a touch sensor related with each option is set greater than the size with which each option is displayed.

Solution to Problem

In order to solve the above-mentioned problems, an information processing apparatus according to the present invention has display control means configured to control such that an option is displayed on display means; and option identification means configured, if a detection corresponding position that is a position in the display means related with a detected position detected by a touch sensor is inside an area in which a corresponding area that is an area including an area in which an option is displayed overlaps two or more options, to identify any of these two or more options on the basis of a positional relation between the detection corresponding position and a corresponding area for each of these two or more options.

Further, another information processing apparatus according to the present invention has a display block, a touch sensor, and a control block, the control block controlling such that an option is displayed on the display block and identifying, if a detection corresponding position that is a position in the display block related with a detected position detected by the touch sensor is inside an area in which a corresponding area that is an area including an area in which an option is displayed overlaps two or more options, any of these two or more options on the basis of a positional relation between the detection corresponding position and a corresponding area for each of these two or more options.

Still further, an information processing method has a display control step of controlling such that an option is displayed on display means, and an option identification step of identifying, if a detection corresponding position that is a position in the display means related with a detected position detected by a touch sensor is inside an area in which a corresponding area that is an area including an area in which an option is displayed overlaps two or more options, any of these two or more options on the basis of a positional relation between the detection corresponding position and a corresponding area for each of these two or more options.

Yet further, a program causes a computer to function as display control means configured to control such that an option is displayed on display means and option identification means configured, if a detection corresponding position that is a position in the display means related with a detected position detected by a touch sensor is inside an area in which a corresponding area that is an area including an area in which an option is displayed overlaps two or more options, to identify any of these two or more options on the basis of a positional relation between the detection corresponding position and a corresponding area for each of these two or more options.

In addition, an information storage medium according to the present invention is a computer-readable information storage medium storing a program for causing a computer to function as display control means configured to control such that an option is displayed on display means and option identification means configured, if a detection corresponding position that is a position in the display means related with a detected position detected by a touch sensor is inside an area in which a corresponding area that is an area including an area in which an option is displayed overlaps two or more options, to identify any of these two or more options on the basis of a positional relation between the detection corresponding position and a corresponding area for each of these two or more options.

In the present invention, if a detection corresponding position is inside an area in which a corresponding area overlaps two or more options, any of these options is identified on the basis of a positional relation between a detection corresponding position and a corresponding area. Thus, according to the present invention, if a corresponding area that is an area in a touch sensor related with an option is set larger than the size in which the option is displayed and a corresponding areas related with different options overlap each other, a user-selected option is properly identified.

In one aspect of the present invention, if the detection corresponding position is in the area where the corresponding area overlaps two or more options, the option identification means identify, from among the plurality of options, an option having a distance that is the shortest from the detection corresponding position to a representative graphic in the corresponding area.

Further, in another aspect of the present invention, if detection corresponding position is in an area where the corresponding area overlaps two or more options, the option identification means identify, from among these two or more options, an option with the size of a display area being smallest or an option with the size of a corresponding area being smallest.

In still another aspect of the present invention, if the detection corresponding position is in an area where the corresponding area overlaps two or more options, the above-mentioned option identification means identify, from among the plurality of options, an option having a highest evaluation in an evaluation value computed on the basis of the length from the detection corresponding position to a representative graphic in the corresponding area and the size of a displayed area or the size of a corresponding area, the evaluation value going higher in evaluation as the length from the detection corresponding position to a representative graphic in the corresponding area gets smaller and going higher in evaluation as one of the size of a displayed area and the size of a corresponding area gets smaller.

In yet another aspect of the present invention, the detection corresponding position is a position corrected in a direction in which a position where a detected position detected by the touch sensor is projected to the display means is set as the upper side.

In a different aspect of the present invention, depending on whether a position in which a detected position detected by the touch sensor is projected to the display means is the left side or the right side of the display means, a direction of the detection corresponding position relative to the projected position is different.

In a still different aspect of the present invention, for an area of which distance from a rim of the display means is within a predetermined value, a distance between the detection corresponding position and a position in which detected position detected by the touch sensor is projected to the display means gets shorter as the distance gets closer to the rim.

In a yet different aspect of the present invention, a front touch sensor overlapping the display means and a rear touch sensor arranged opposite to the front touch sensor are provided as the touch sensor and a ratio of the size of a corresponding area corresponding to an option to the size of an area in which an option is displayed is larger in the case where the position of an object has been detected by the rear touch sensor than in the case where the position of an object has been detected by the front touch sensor.

DESCRIPTION OF EMBODIMENTS

The following describes details of one embodiment of the present invention with reference to the drawings.

Figure 1A:
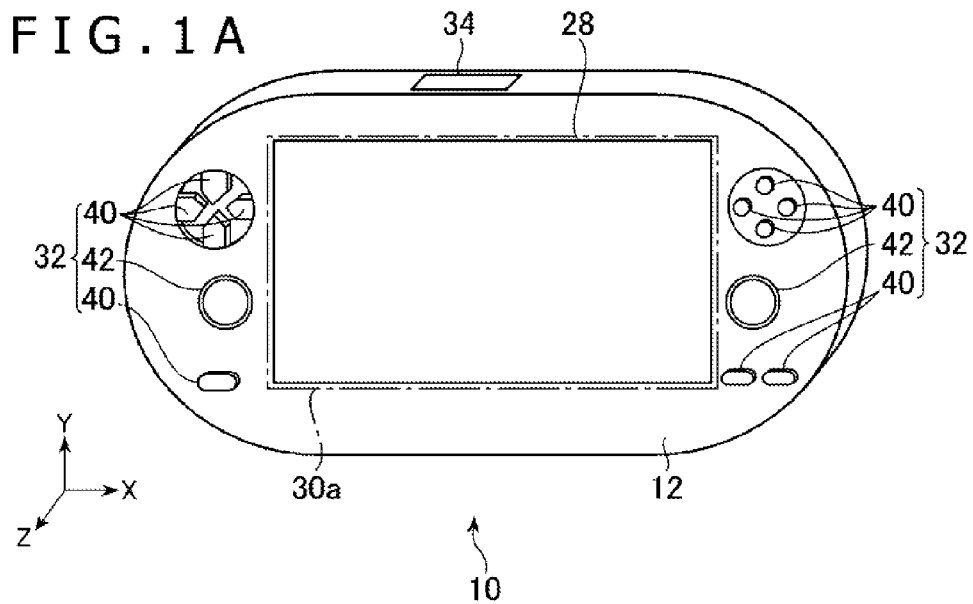
FIG. 1A is a perspective view illustrating one example of an external view of an information processing apparatus practiced as one embodiment of the present invention.
Figure 1B:
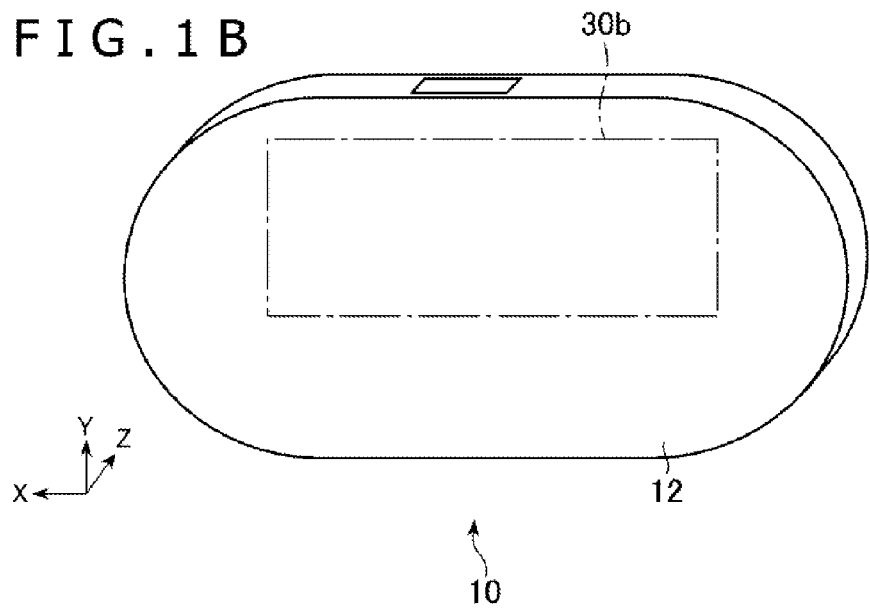
FIG. 1B is a perspective view illustrating another example of an external view of the information processing apparatus practiced as one embodiment of the present invention.
Figure 2:
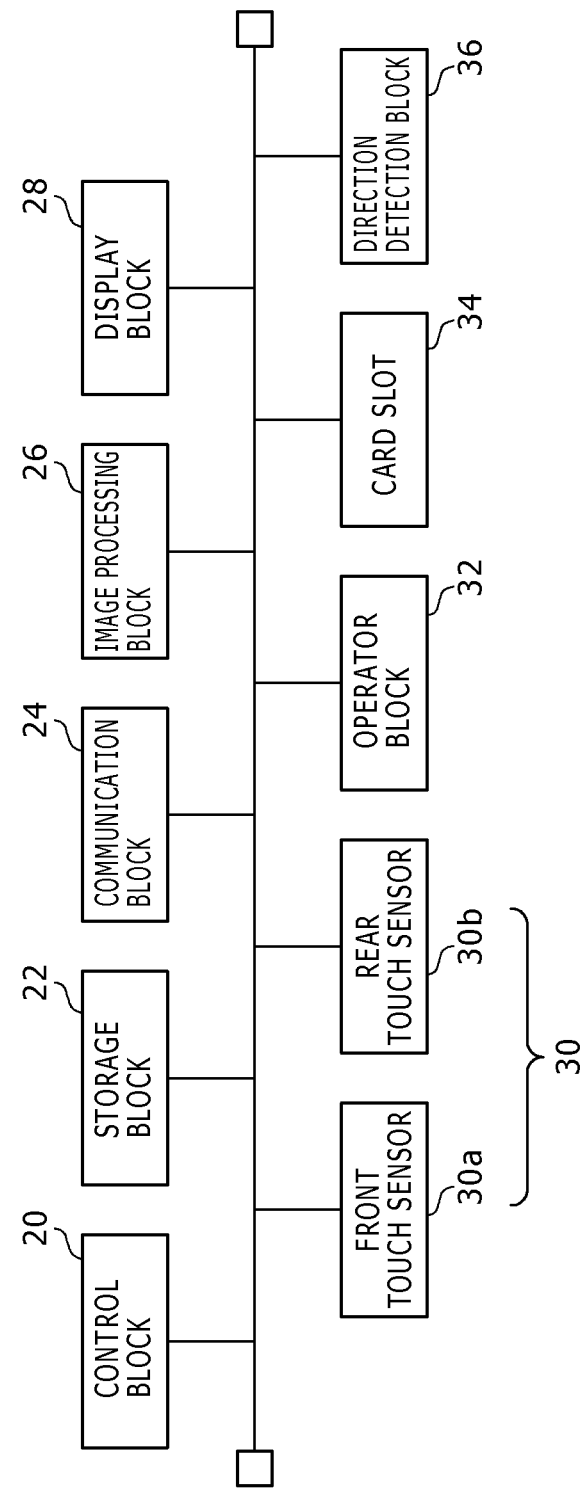
FIG. 2 is a configuration diagram illustrating one example of a hardware configuration of the information processing apparatus practiced as one embodiment of the present invention.

FIG. 1A and FIG. 1B are perspective views illustrating external views of an information processing apparatus 10 practiced as one embodiment of the present invention, FIG. 1A being indicative of a manner in which the information processing apparatus 10 is seen from the front side, FIG. 1B being indicative of a manner in which the information processing apparatus 10 is seen from the rear side. FIG. 2 is a configuration diagram illustrating one example of a hardware configuration of the information processing apparatus 10 shown in FIG. 1A and FIG. 1B. It is assumed that the information processing apparatus 10 according to the present invention be a portable device such as a portable game machine or the like, for example.

As shown in FIG. 1A and FIG. 1B, the information processing apparatus 10 according to the present embodiment is overall planar in shape. In what follows, the horizontal direction (the width direction) of a housing 12 is X-axis direction and the vertical direction (the height direction) is Y-axis direction, and the thickness direction (the depth direction) is X-axis direction. In addition, in the present embodiment, the direction going from left to right as seen from the front side of the housing 12 is X-axis forward direction, the direction going from bottom to top as seen from the front side of the housing 12 is Y-axis forward direction, and direction going from rear to front of the housing 12 is Z-axis forward direction. As shown in FIG. 1A, FIG. 1B, and FIG. 2, the information processing apparatus 10 according to the present embodiment has a control block 20, a storage block 22, a communication block 24, an image processing block 26, a display block 28, touch sensors 30 (a front touch sensor 30a and a rear touch sensor 30b in the present embodiment), an operator block 32, a card slot 34, a direction detection block 36, and so on. These elements are interconnected through a bus.

The control block 20 is a CPU or the like for example and executes various kinds of information processing in accordance with a program stored in the storage block 22. The storage block 22 is a memory element such as a RAM or a ROM for example and stores programs to be executed by the control block 20 and various kinds of data. In addition, the storage block 22 also functions as a work memory for the control block 20. The communication block 24 is a network interface (to be more specific, a wireless LAN module for example) and, in accordance with instructions entered from the control block 20, transmits information to another information processing apparatus 10 and a server (not shown) on the Internet. This communication block 24 also outputs received information to the control block 20.

The image processing block 26 is configured by including a GPU and a frame buffer memory, for example, and draws an image to be displayed on the display block 28 in accordance with instructions outputted by the control block 20. As a specific example, the image processing block 26 has a frame buffer memory corresponding to a display area of the display block 28 and the GPU writes an image to this frame buffer memory at predetermined time intervals in accordance with instructions from the control block 20. Then, the image written to this frame buffer memory is converted into a video signal with a predetermined timing to be displayed on the display block 28.

The display block 28 according to this embodiment is one of various types of image display devices such as a liquid crystal display panel, an organic EL display panel and the like. The touch sensor 30 according to the present embodiment is a sensor that sequentially detects the contact of an object on a detection surface at predetermined time intervals. The information processing apparatus 10 according to the present embodiment has two touch sensors 30 (the front touch sensor 30a and the rear touch sensor 30b).

The front of the housing 12 of the information processing apparatus 10 according to the present embodiment has a touch panel with the display block 28 and the front touch sensor 30a unitized. The touch panel according to the present embodiment is approximately rectangular in shape. The front touch sensor 30a is arranged as overlapped on the display block 28 and has an approximately rectangular detection surface having a shape and size corresponding to the display surface of the display block 28. In addition, in the present embodiment, if the front touch sensor 30a detects contact of an object, the front touch sensor 30a detects a contact position of this object as a detection position. It should be noted that the front touch sensor 30a may detect the position relative to the detection surface of an object if the object comes within a detectable range of the detection surface, rather than always detecting the position of the object only when the object comes in contact with the detection surface. Further, the front touch sensor 30a according to the present embodiment is a sensor capable of detecting an area (a contact area) of the portion in which an object is in contact with the detection surface.

The rear touch sensor 30b is arranged on the rear of the housing 12 at a position on the other side of the front touch sensor 30a. Further, in the present embodiment, the rear touch sensor 30b is arranged with the left half thereof opposite to the left half of the front touch sensor 30a and the right half of the rear touch sensor 30b opposite to the right half of the front touch sensor 30a, both as seen from the front of the housing 12. The rear touch sensor 30b according to the present embodiment has an approximately rectangular detection surface with the length in X-axis direction thereof being approximately the same as that of the front touch sensor 30a and the length in Y-axis direction being shorter than that of the front touch sensor 30a, thereby detecting the position of an object on the detection surface at predetermined time intervals in a similar way to the front touch sensor 30a. That is, the display surface of the display block 28, the detection surface of the front touch sensor 30a, and the detection surface of the rear touch sensor 30b are arranged in parallel to the XY plane of the housing 12 and along the thickness direction (the Z-axis direction) of the housing 12 in a linear manner. In addition, the rear touch sensor 30b according to the present embodiment is a sensor that can detect an area (a contact area) of the portion in contact with the detection surface of an object as with the front touch sensor 30a.

The front touch sensor 30a and the rear touch sensor 30b according to the present embodiment may be any type of devices if capable of detecting the position of an object on the detection surface, such as electrostatic capacity type, pressure sensitive type, or optical type, for example. It should be noted that, in the present embodiment, it is assumed that the front touch sensor 30a and the rear touch sensor 30b be multipoint detection type touch sensors capable of detecting the contact of objects at two or more positions (a maximum of eight positions for example). Also, the front touch sensor 30a and the rear touch sensor 30b according to the present embodiment may be sensors that detect the strength (or the pressure) of an object against the detection surface.

It should be noted that, if the front touch sensor 30a and the rear touch sensor 30b are arranged opposite to each other, the rear touch sensor 30b need not be approximately the same in X-axis length as that of the front touch sensor 30a and need not be shorter in Y-axis length than that of the front touch sensor 30a like the example described above. For example, the front touch sensor 30a and the rear touch sensor 30b may be approximately the same in shape and size.

In the present embodiment, the display position of information inside the display block 28, the detection position of an object inside the front touch sensor 30a, and the detection position of an object inside the rear touch sensor 30b are represented by combinations of X-coordinate values and Y-coordinate values in a same coordinate system. That is, a position in the front touch sensor 30a and a position in the display block 28 overlapping with the position in the front touch sensor 30a are the same in the combination of X-coordinate value and Y-coordinate value. Further, a position in the rear touch sensor 30b and a position obtained by projecting the position in the rear touch sensor 30b onto the display surface of the display block 28 along Z-axis direction are the same in X-coordinate value and Y-coordinate value.

Also, in the present embodiment, it is assumed that the coordinate values of the lower left ends of the display block 28 and the front touch sensor 30a be (X0, Y0), the coordinate values of the lower right ends of the display block 28 and the front touch sensor 30a be (X1, Y0), the coordinate values of the upper left ends of the display block 28 and the front touch sensor 30a be (X0, Y1), and the coordinate values of the upper right ends of the display block 28 and the front touch sensor 30a be (X1, Y1). It should also be noted that, in the present embodiment, the coordinate values are represented in pixels.

It should be noted that, in what follows, each user performs operation input by touching user's finger onto the front touch sensor 30a and the rear touch sensor 30b; however, it is also practicable for the user to perform operation input by touching a hand-held object such as a stylus onto the detection surface.

The operator block 32 is a type of operation member for use for the user to perform operation input into the information processing apparatus 10. FIG. 1A shows buttons 40 and analog sticks 42 arranged on the front surface of the housing 12 of the information processing apparatus 10 as one example of operation members that make up the operator block 32. It should be noted that the information processing apparatus 10 may have switches and buttons 40 arranged on the upper surface of the housing 12, for example, as operation members making up the operator block 32.

The card slot 34 is a slot through which information storage media such as a memory card or the like is detachably inserted; programs and data stored in the information storage media such as a memory card or the like are read and data is written thereto. In the present embodiment, the card slot 34 is arranged on the upper side of the housing of the information processing apparatus 10. It should be noted that the information processing apparatus 10 may have two or more card slots 34, which may accommodate information storage media based on different standards.

The direction detection block 36 is a sensor for detecting the direction in which the housing 12 is positioned. In the present embodiment, the direction detection block 36 is a three-axis acceleration sensor capable of detecting the direction of gravity acceleration for example and can detect how the housing 12 lies relative to perpendicular direction. In the present embodiment, the direction detection block 36 detects how the housing 12 lies relative to perpendicular direction at predetermined time intervals.

Figure 3:
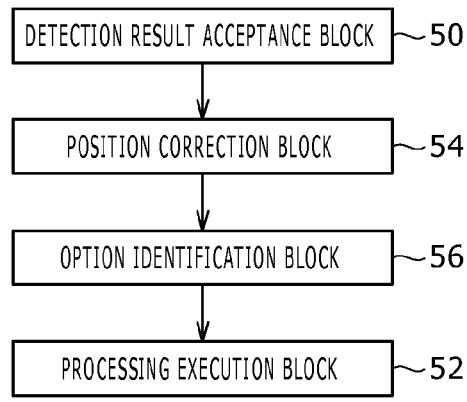
FIG. 3 is a functional block diagram illustrating one example of functions that are realized by the information processing apparatus practiced as one embodiment of the present invention.

Referring to FIG. 3, there is shown a functional block diagram illustrating one example of functions that are realized by the information processing apparatus 10 according to the present embodiment. As shown in FIG. 3, the information processing apparatus 10 functionally has a detection result acceptance block 50, a processing execution block 52, a position correction block 54, and an option identification block 56. These elements are realized by the information processing apparatus 10 that is a computer through the execution of a program according to the present embodiment. For example, this program has instructions for controlling the computer in order to realize the elements shown in FIG. 3. Also, this program may be downloaded from another computer through a communication interface via a computer communication network and installed on the information processing apparatus 10 or may be stored in a computer-readable information storage medium such as an optical disk (CD-ROM, DVD-ROM, Blu-ray disc or the like), a USB memory, or a memory card and installed on the information processing apparatus 10 from the information storage medium.

The user of the information processing apparatus 10 according to the present embodiment performs operation input in the information processing apparatus 10 by touching user's finger onto the detection surface of the front touch sensor 30a or the rear touch sensor 30b or sliding user's finger kept touched on the detection surface. In what follows, an operation in which the user touches one point on the detection surface for a short period of time is referred to as a tap operation. Also, the user can perform operation input in the information processing apparatus 10 by pressing buttons 40.

Figure 4:
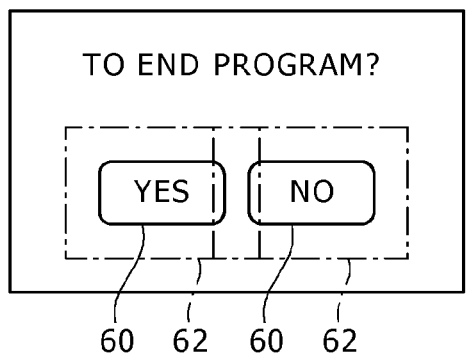
FIG. 4 is a diagram illustrating one example of a screen that is displayed on a display block.
Figure 5:
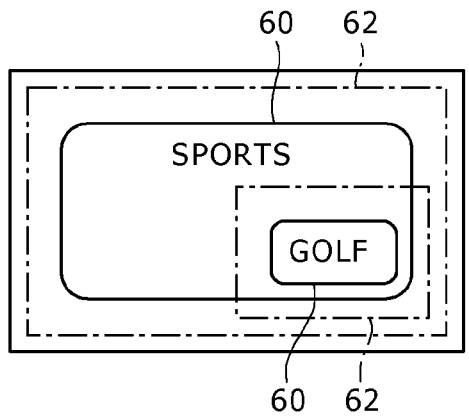
FIG. 5 is a diagram illustrating another example of the screen that is displayed on the display block.
Figure 6:
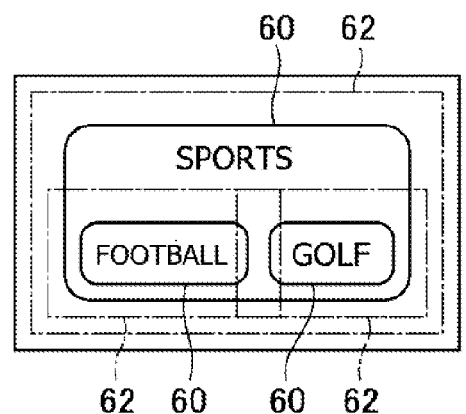
FIG. 6 is a diagram illustrating still another example of the screen that is displayed on the display block.

Referring to FIG. 4, there is shown a diagram illustrating one example of a screen that is shown on the display block 28 of the information processing apparatus 10. Shown in FIG. 4 is a screen in which two option images 60 are arranged side by side. FIG. 5 shows another example of a screen that is displayed on the display block 28 of the information processing apparatus 10. Shown in FIG. 5 is a screen in which another option image 60 is arranged in an area occupied by one option image 60. FIG. 6 shows still another example of a screen that is displayed on the display block 28 of the information processing apparatus 10. Shown in FIG. 6 is a screen in which two option images 60 are arranged in an area occupied by one option image 60.

In the present embodiment, the user is allowed to perform a tap operation for selecting one of option images 60 when a screen in which two or more option images 60 are arranged is displayed on the display block 28 as shown in FIG. 4, FIG. 5, and FIG. 6. When the user performs a tap operation on one of the option images 60, the information processing apparatus 10 executes the processing corresponding to the contents indicated by the option image 60 tapped by the user.

The following describes operations to be executed by the information processing apparatus 10 when an operation of selecting the option image 60 is performed by the user by tapping the front touch sensor 30a.

As described above, in the present embodiment, the touch sensor 30 sequentially detects the contact of an object on the detection surface at predetermined time intervals and outputs a detection result (a detected position) corresponding to the contact position of the object to the detection result acceptance block 50. Consequently, when a tap operation is performed on the option image 60 by the user, the front touch sensor 30a detects the touch of user's finger and outputs a detection result (in the present embodiment, detected position data corresponding to a detected position that was detected, for example) to the detection result acceptance block 50. Then, the detection result acceptance block 50 accepts the detected position data outputted from the front touch sensor 30a. In the present embodiment, detected position data includes the coordinates of detection position (hereafter referred to as detected position coordinates) in the front touch sensor 30a represented by a combination of X-coordinate values and Y-coordinate values and a touch flag indicative of which of the front touch sensor 30a and the rear touch sensor 30b has been touched, for example. Here, because a situation in which a tap operation has been performed on the front touch sensor 30a is assumed, the touch flag included in the detected position data indicates that the front touch sensor 30a has been touched.

The processing execution block 52 executes control such that various kinds of information (the screens as shown in FIG. 4, FIG. 5, and FIG. 6, for example) are generated to be displayed on the display block 28. In addition, if the option image 60 is identified by the option identification block 56 to be described later, the processing execution block 52 executes control such that processing corresponding to the identified option image 60 is executed and processing results are displayed.

In the present embodiment, the option image 60 is an approximately rectangular image with the upper side and the lower side extending in the X-axis direction and the left side and the right side extending in the Y-axis direction. Further, in the present embodiment, when executing control such that a screen in which the option image 60 is arranged is displayed on the display block 28, the processing execution block 52, at the same time, sets, for each option image 60, an option corresponding area 62 including an area occupied by the option image 60.

In the present embodiment, the processing execution block 52 sets the vertical length of the option corresponding area 62 corresponding to the displayed option image 60 to 80 pixels (equivalent to 16 millimeters if 10 pixels correspond to two millimeters) if the vertical length of the option image 60 is smaller than 60 pixels (equivalent to 12 millimeters if 10 pixels correspond to two millimeters); if the vertical length of the option corresponding area 62 is equal to or larger than 60 pixels, the processing execution block 52 sets the option corresponding area 62 to a length 80 pixels plus 20 pixels, for example. Likewise, if the horizontal length of the option image 60 is smaller than 60 pixels, the horizontal length of the option corresponding area 62 corresponding to the displayed option image 60 is set to 80 pixels; if the horizontal length of the option image 60 is equal to or larger than 60 pixels, the horizontal length of the option corresponding area 62 is set to 80 pixels plus 20 pixels. Then, the processing execution block 52 determines the position of the option corresponding area 62 at a position where the option image 60 and the gravity center overlap each other.

For example, if option images 60 are arranged in the proximity of each other as shown in FIG. 4 or an option image 60 is arranged in an area occupied by another option image 60 as shown in FIG. 5 and FIG. 6, then option corresponding areas 62 corresponding to two or more different option images 60 may overlap each other. In what follows, an area in which two or more option corresponding areas 62 overlap each other for two or more option images 60 is referred to as an overlapped area.

The position correction block 54 corrects at least one direction of the X-coordinate value and Y-coordinate value of detected position coordinates. In the present embodiment, the position correction block 54 corrects the Y-coordinate values of the detected position coordinates such that a shift is made in the Y-axis forward direction. Also, in the present embodiment, the position correction block 54, for example, corrects the Y-coordinate values of detected position coordinates such that, for the distance from the upper and lower rims of the display block 28 being within a predetermined value, for example, the amount of correction is smaller as the distance is nearer the rims.

To be more specific, the position correction block 54 increases Y-coordinate value Yp of detected position coordinates by (Yp−Y0) pixels if this Y-coordinate values Yp is equal to or larger than Y0 and smaller than (Y0+10), 10 pixels if this Y-coordinate value Yp is equal to or larger than (Y0+10) and smaller than (Y1−10), and (Y1−Yp) pixels if this Y-coordinate value Yp is equal to or larger than (Y1−10) and equal to or smaller than Y1. In what follows, position coordinates corrected by the position correction block 54 are referred to as corrected position coordinates and a position represented by corrected position coordinates is referred to as a corrected position.

Next, if a combination of the X-coordinate value and Y-coordinate value of corrected position coordinates is within at least one option corresponding area 62, the option identification block 56 identifies one of the option images 60 displayed on the display block 28 on the basis of a positional relation between the corrected position and the option corresponding area 62 as the option image 60 on which a tap operation has been performed by the user. Here, if the number of option corresponding areas 62 in which the corrected position is included is one, then, the option identification block 56 identifies the option image 60 related with this option corresponding area 62. On the other hand, if there are two or more option corresponding areas 62 that include the corrected position, namely, if the corrected position is included in an overlapped area, then an option image 60 corresponding to any of candidate areas is identified on the basis of the corrected position and the position of each of the option corresponding areas 62 (hereafter referred to as candidate areas) in which the overlapped area is included.

In the present embodiment, the option identification block 56 computes a distance from the corrected position to a representative graphic (a representative point of gravity center or the like or a representative side of nearest side or the like, for example) of the option corresponding area 62, for each of candidate areas. Then, from two or more candidate areas, the option identification block 56 identifies the option corresponding area 62 having the shortest computed distance.

Then, the processing execution block 52 executes the processing corresponding to the option image 60 related with the option corresponding area 62 identified by the option identification block 56. In the example shown in FIG. 4, if the option image 60 arranged with a character string "YES" is identified by the option identification block 56, the processing execution block 52 executes end processing of a program being executed in the information processing apparatus 10.

As described above, in the information processing apparatus 10 according to the present embodiment, when the user performs a tap operation on the front touch sensor 30a for selecting one of option images 60 while a screen on which two or more option images 60 are displayed is displayed on the display block 28, then the processing is executed in the order of (1) outputting of detected position data from the front touch sensor 30a to the detection result acceptance block 50, (2) computation of corrected position coordinates by the correction of detected position coordinates by the position correction block 54, (3) identification of an option image 60 based on the corrected position coordinates by the option identification block 56, and (4) execution of the processing corresponding to the identified option image 60 by the processing execution block 52.

It should be noted that, in the information processing apparatus 10 according to the present embodiment, if a tap operation is performed by the user onto the rear touch sensor 30b while a screen in which two or more option images 60 are displayed is displayed on the display block 28, then the processing described above may be executed in substantially the same manner in which a tap operation has been performed on the front touch sensor 30a on the basis of the detected position coordinates represented by the X-coordinate value and Y-coordinate value of the detected position on the rear touch sensor 30b.

Further, in the information processing apparatus 10 according to the present embodiment, in executing control such that a screen in which option images 60 are arranged is displayed on the display block 28, the processing execution block 52 may set both of the option corresponding area 62 (a front option corresponding area) related with the front touch sensor 30a and the option corresponding area 62 (a rear option corresponding area) related with the rear touch sensor 30b for each option image 60. Further, the processing execution block 52 may set the front option corresponding area and the rear option corresponding area such that the size of the rear option corresponding area is larger than the size of the front option corresponding area and the rear option corresponding area becomes an area that includes the front option corresponding area. If a tap operation is performed on the front touch sensor 30a (if the touch flag included in detected position data indicates that the front touch sensor 30a has been touched), the option identification block 56 identifies the option image 60 related with the front option corresponding area in which the corrected position is included; if a tap operation is performed on the rear touch sensor 30b (if the touch flag included in detected position data indicates that the rear touch sensor 30b has been touched), the option identification block 56 may identify the option image 60 related with the rear option corresponding area in which the corrected position is included.

As described above, because an area wider than the option image 60 is set as the option corresponding area 62 in the information processing apparatus 10 according to the present embodiment, the user of the information processing apparatus 10 can easily select the option image 60. Then, in the information processing apparatus 10 according to the present embodiment, even if the corrected position is within an overlapped area in which two or more option corresponding areas 62 overlap each other, one of the option images 60 is identified by the option identification block 56 as described above. In addition, while the screen such as one shown in FIG. 6 is displayed in the display block 28, even if the corrected position is within an overlapped area in which three or more option corresponding areas 62 overlap each other, one of the option images 60 is identified by the option identification block 56 as described above.

Further, experiments indicated that the user of the information processing apparatus 10 perform tap operations at positions approximately two millimeters (equivalent to 10 pixels if 10 pixels correspond to two millimeters) under the position at which each tap operation should be done. In the information processing apparatus 10 according to the present embodiment, the corrected position is set above the detected position, so that, as compared with the case where the detected position is not corrected by the position correction block 54, the possibility of occurrence of tap operation errors by the user is expected to be decreased.

Still further, for an area in which the distance from the upper and lower rims of the display block 28 is within a predetermined value in the information processing apparatus 10 according to the present embodiment, the amount of correction gets smaller as the distance approaches the rims, so that the user of the information processing apparatus 10 can easily perform tap operations also at positions near the upper and lower rims.

It should be noted that the present invention is not restricted to the embodiment described above.

For example, the option identification block 56 may identify the option image 60 in accordance with rules that are different from the rules described above. For example, from among the option images 60 related with two or more candidate areas, the option identification block 56 may identify the option image 60 having the smallest area. Alternatively, the option identification block 56 may first identify the candidate area having the smallest area among two or more candidate areas and then identify the option image 60 related with the identified candidate area, for example.

In addition, the option identification block 56 may identify the option image 60 on the basis of an evaluation value (for example, an evaluation value that is higher as the distance from the corrected position to the representative graphic of the option corresponding area 62 is shorter and higher as the area in which the option image 60 is displayed is smaller) that is computed on the basis of two or more elements (for example, the distance from the corrected position to the representative graphic of the option corresponding area 62, the size in which the option image 60 is displayed, and so on). To be more specific, for example, the option identification block 56 may identify, from among two or more candidate areas, a candidate area in which an evaluation value that is a sum or a product of a reciprocal of the distance from the corrected position to the representative graphic of the candidate area and a reciprocal of the area in which an option image 60 related with the candidate area is displayed is the largest and then identify an option image 60 related with the identified candidate area. It should be noted that the option identification block 56 may also identify, from among two or more candidate areas, a candidate area in which an evaluation value that is a sum or a product of the distance from the corrected position to the representative graphic of the candidate area and the area in which an option image 60 related with the candidate area is displayed is the smallest and then identify an option image 60 related with the identified candidate area.

Further, from among two or more candidate areas, the option identification block 56 may first sequentially select a candidate area corresponding to the conditions, thereby identifying the option image 60 related with the candidate area thus identified. To be more specific, the option identification block 56 may first identify candidate areas in which the area where the option image 60 related with the candidate area is displayed is equal to or lower than a predetermined value as selection candidate areas and identify a selection candidate area having the shortest distance from the corrected position to the representative graphic of the candidate area, thereby identifying the option image 60 related with the identified selection candidate areas, for example.

In addition, the position correction block 54 may make corrections for the X-coordinate values of the detected position coordinates in accordance with a position at which a tap operation has been performed. For example, if an area (the left half area for example) to the left side of the display block 28 is tapped, the Y-coordinate values of the detected position coordinate may be increased and the values obtained by increasing the X-coordinate values of the detected position coordinate may be determined as the X-coordinate values of the corrected position coordinate (a position resulted from shifting the detection position in the upper right direction may be set as the corrected position); if an area (the right half area for example) to the right side of the display block 28 is tapped, the Y-coordinate values of the detected position coordinate may be increased and a value obtained by decreasing the X-coordinate values of the detected position coordinate may be determined as the X-coordinate values of the corrected position coordinate (a position resulted from shifting the detected position in the upper left direction may be set as the corrected position).

Figure 7:
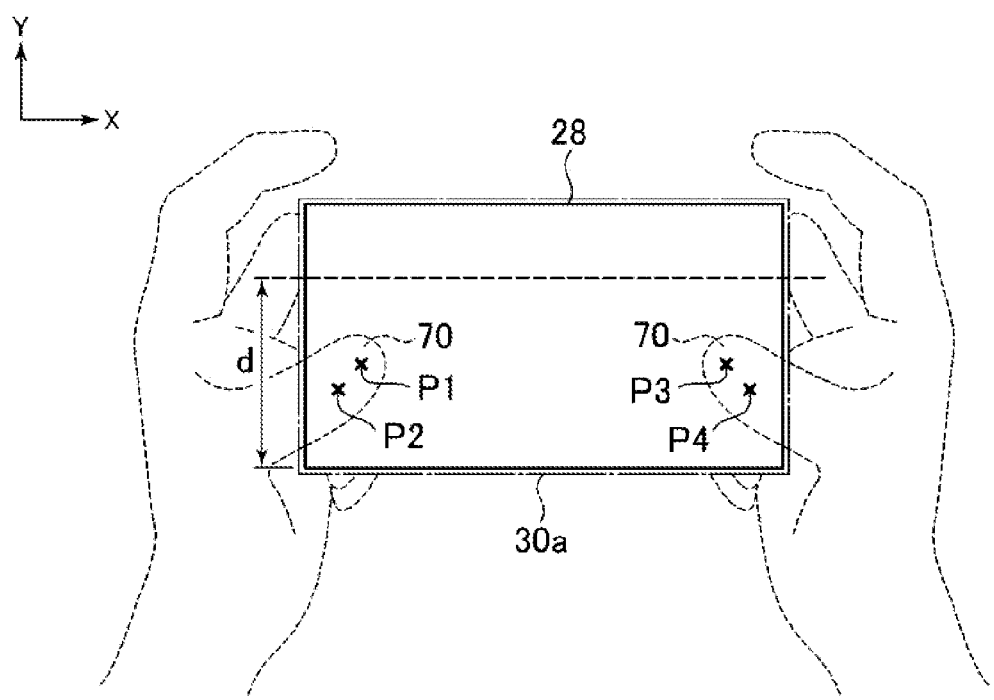
FIG. 7 is a diagram illustrating one example of a manner in which a situation where a user operates a front touch sensor with user's thumb is seen from the front side of the information processing apparatus practiced as one embodiment of the present invention.

For example, in a condition where the user of the information processing apparatus 10 holds the information processing apparatus 10 and operates the front touch sensor 30a with the thumbs 70 as shown in FIG. 7, it is considered that the user tends to perform a tap operation on position P2 at lower left of position P1 to be tapped with the left thumb 70 with respect to the left side (namely, the left side of the display block 28) of the front touch sensor 30a; with respect to the right side (namely, the right side of the display block 28) of the front touch sensor 30a, it is considered that the user tends to perform a tap operation on position P4 in the lower right of position P3 to be tapped with the right thumb 70. Consequently, it is expected that the correction described above decrease the possibility of the occurrence of tap operation errors by the user.

It should be noted that, in a condition where the user of the information processing apparatus 10 is holding the information processing apparatus 10 as shown in FIG. 7, it is highly possible that only an area of which distance from the lower rim of the display block 28 is equal to or less than predetermined value d is tapped with the thumb 70. Therefore, only for the area of which distance from the lower rim of the display block 28 is equal to or less than predetermined value d, the position correction block 54 may, if the area to the left of the display block 28 is tapped, set a position resulted from shifting the detected position in the upper right direction as the corrected position; if the area to the right of the display block 28 is tapped, the position correction block 54 may set a position resulted from shifting the detected position in the upper left direction as the corrected position. In addition to the processing described above, for an area of which distance from the lower rim of the display block 28 is larger than predetermined value d, the position correction block 54 may, if the area to the left of the display block 28 is tapped, set a position resulted from shifting the detected position in the upper left direction as the corrected position; if the area to the right of the display block 28 is tapped, the position correction block 54 may set a position resulted from shifting the detected position in the upper right direction as the corrected position.

Further, if, for all the area of the display block 28, the area to the left of the display block 28 is tapped, the position correction block 54 may set a position resulted from shifting the detected position in the upper left direction as the corrected position; if the area to the right of the display block 28 is tapped, the position correction block 54 may set a position resulted from shifting the detected position in the upper right direction as the corrected position. This configuration is suitable for a situation in which an area to the left of the display block 28 is tapped with a user's right finger (the index finger of the right hand, for example) and an area to the right of the display block 28 is tapped with a user's left finger (the index finger of the left hand, for example), for example.

Figure 8:
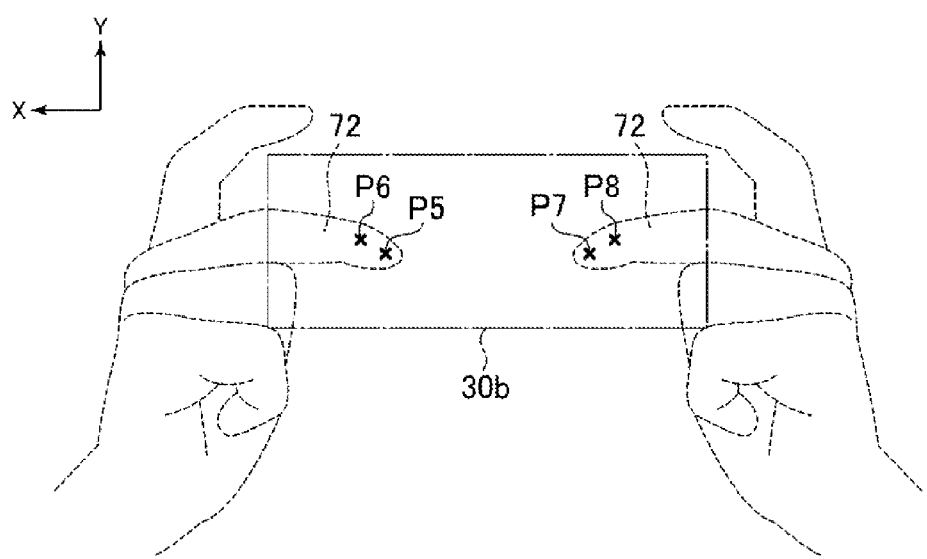
FIG. 8 is a diagram illustrating one example of a manner in which a situation where a user operates a rear touch sensor with user's middle finger is seen from the rear side of the information processing apparatus practiced as one embodiment of the present invention.

Still further, in a situation in which the user of the information processing apparatus 10 holds the information processing apparatus 10 and operates the rear touch sensor 30*b* with the middle finger 72 as shown in FIG. 8, it is considered that the user tends to perform a tap operation on position P6 (position P6 in the upper left of position P5 in FIG. 8) in the upper right of position P5 to be tapped with the right middle finger 72 for the right side of the display block 28 (the left side in FIG. 8); for the left side of the display block 28 (the right side in FIG. 8), it is considered that the user tends to perform a tap operation on position P8 (in FIG. 8, position P8 in the upper right of position P7) of position P7 to be tapped with the left middle finger 72.

Consequently, if an area (an area to the right side in FIG. 8) to the left of the rear touch sensor 30*b* as viewed from the front side of the information processing apparatus 10 is tapped, the position correction block 54 may decrease the Y-coordinate values of the detected position coordinate and determine a value obtained by increasing the X-coordinate values of the detected position coordinate as the X-coordinate values of the corrected position coordinate (set a position resulted from shifting the detected position in the lower right direction (the lower left direction in FIG. 8) as viewed from the front side of the display block 28); if an area (an area to the left side in FIG. 8) to the right of the rear touch sensor 30*b* as viewed from the front side of the information processing apparatus 10 is tapped, the position correction block 54 may decrease the Y-coordinate values of the detected position coordinate and determine a value obtained by decreasing the X-coordinate values of the detected position coordinate as the X-coordinate values of the corrected position coordinate (set a position resulted from shifting the detected position in the lower left direction (the lower right direction in FIG. 8)). Also, this correction may be executed only on a part of area in the rear touch sensor 30*b* (for example, an area of which distance from the upper rim of the rear touch sensor 30*b* is equal to or less than predetermined value d) as described above, for example.

Further, for example, the information processing apparatus 10 may determine whether the information processing apparatus 10 is held by the left hand or the right hand on the basis of detection results provided by the direction detection block 36 and detection results provided by the touch sensor 30, for example. If the information processing apparatus 10 is found tilting to the left, for example, the information processing apparatus 10 may determine that the information processing apparatus 10 is held by the left hand; if the information processing apparatus 10 is found tilting to the right, the information processing apparatus 10 may determine that the information processing apparatus 10 is held by the right hand. Also, a left-side position as viewed from the front side of the information processing apparatus 10 is detected by the rear touch sensor 30*b*, for example, the information processing apparatus 10 may determine that the information processing apparatus 10 is held by the left hand; if a right-side position as viewed from the front side of the information processing apparatus 10 is detected, the information processing apparatus 10 may determine that the information processing apparatus 10 is held by the right hand. Then, if the information processing apparatus 10 is found held by the left hand, the position correction block 54 may set a position resulted from shifting the detected position in the upper left direction as the corrected position; if the information processing apparatus 10 is found held by the right hand, the position correction block 54 may set a position resulted from shifting the detected position in the upper right direction as the corrected position.

It is also practicable that the option identification block 56 identifies the option image 60 on the basis of positional relationships between the detection position and the option corresponding area 62 without correcting the detected position by the position correction block 54.

It is also practicable that the processing execution block 52 sets the option corresponding area 62 such that the position of the gravity center of the option corresponding area 62 is shifted from the gravity center of the option image 60 (such that the gravity center of the option corresponding area 62 is positioned below the gravity center of the option image 60, for example).

In the information processing apparatus 10 according to the embodiment described above, the upper side (Y-axis forward direction) of the display block 28 is preset; however, it is practicable that the information processing apparatus 10 identifies the upper side of the display block 28 on the basis of detection results provided by the direction detection block 36, for example. That is, the position correction block 54 may compute, as the corrected position, a position resulted from shifting the detected position in the direction identified by the direction detection block 36 as the opposite direction to the direction of gravity acceleration.

Besides, the information processing apparatus 10 may have a hard disk drive, a microphone, a speaker, a camera, and so on, for example. It is also practicable for the information processing apparatus 10 described above to be configured by two or more housings.

It should be noted that the specific character strings and numeric values mentioned above and the specific character strings and numeric values in the drawings are illustrative only and therefore not restricted to these specific character strings and numeric values.

The invention claimed is:

1. An information processing apparatus comprising:
a display control unit configured to control such that one or more options are displayed on a display unit, where each option includes a representative graphic and a corresponding area within which the representative graphic is located; and
an option identification unit configured to:
  (i) process detection corresponding positions, which are respective positions in said display unit related with respective detected positions detected by a touch sensor,
  (ii) select from among at least two of the options when the corresponding areas of the at least two options overlap one another by:
    (a) computing an evaluation value for each of the at least two options, each evaluation value being at least one of a sum and product of: a reciprocal of a distance between the detection corresponding position and the representative graphic, and a reciprocal of one of a size of the representative graphic and a size of the corresponding area, and
    (b) selecting the option from among the at least two options having a higher evaluation value.

2. The information processing apparatus according to claim 1, wherein said detection corresponding position is a position corrected in a direction in which a position where a detected position detected by said touch sensor is projected to said display unit is set as the upper side.

3. The information processing apparatus according to claim 1, wherein, depending on whether a position in which a detected position detected by said touch sensor is projected to said display unit is the left side or the right side of said display unit, a direction of said detection corresponding position relative to said projected position is different.

4. The information processing apparatus according to claim 2, wherein, for an area of which distance from a rim of said display unit is within a predetermined value, a distance between said detection corresponding position and a position in which detected position detected by said touch sensor is projected to said display unit gets shorter as the distance gets closer to the rim.

5. The information processing apparatus according to claim 1, wherein:
   a front touch sensor overlapping said display unit and a rear touch sensor arranged opposite to said front touch sensor are provided as said touch sensor, and
   a ratio of the size of the corresponding area and the representative graphic is larger when the option is located on said rear touch sensor as compared with when the option is located on said front touch sensor.

6. An information processing apparatus comprising:
   a display block;
   a touch sensor; and
   a control block, said control block operating to:
   (i) control such that one or more options are displayed on the display block, where each option includes a representative graphic and a corresponding area within which the representative graphic is located;
   (ii) process detection corresponding positions, which are respective positions in said display unit related with respective detected positions detected by a touch sensor; and
   (iii) select from among at least two of the options when the corresponding areas of the at least two options overlap one another by:
      (a) computing an evaluation value for each of the at least two options, each evaluation value being at least one of a sum and product of: a reciprocal of a distance between the detection corresponding position and the representative graphic, and a reciprocal of one of a size of the representative graphic and a size of the corresponding area, and
      (b) selecting the option from among the at least two options having a higher evaluation value.

7. An information processing method comprising:
   controlling such that one or more options are displayed on a display, where each option includes a representative graphic and a corresponding area within which the representative graphic is located;
   processing detection corresponding positions, which are respective positions in said display unit related with respective detected positions detected by a touch sensor;
   selecting from among at least two of the options when the corresponding areas of the at least two options overlap one another by:
      (a) computing an evaluation value for each of the at least two options, each evaluation value being at least one of a sum and product of: a reciprocal of a distance between the detection corresponding position and the representative graphic, and a reciprocal of one of a size of the representative graphic and a size of the corresponding area, and
      (b) selecting the option from among the at least two options having a higher evaluation value.

8. A computer having a microprocessor operating under the control of a program, which causes the microprocessor to function as:
   a display control unit configured to control such that one or more options are displayed on a display unit, where each option includes a representative graphic and a corresponding area within which the representative graphic is located; and
   an option identification unit configured to:
   (i) process detection corresponding positions, which are respective positions in said display unit related with respective detected positions detected by a touch sensor,
   (ii) select from among at least two of the options when the corresponding areas of the at least two options overlap one another by:
      (a) computing an evaluation value for each of the at least two options, each evaluation value being at least one of a sum and product of: a reciprocal of a distance between the detection corresponding position and the representative graphic, and a reciprocal of one of a size of the representative graphic and a size of the corresponding area, and
      (b) selecting the option from among the at least two options having a higher evaluation value.

9. A non-transitory, computer-readable information storage media storing a program for causing a computer to function as:
   a display control unit configured to control such that one or more options are displayed on a display unit, where each option includes a representative graphic and a corresponding area within which the representative graphic is located; and
   an option identification unit configured to:
   (i) process detection corresponding positions, which are respective positions in said display unit related with respective detected positions detected by a touch sensor,
   (ii) select from among at least two of the options when the corresponding areas of the at least two options overlap one another by:
      (a) computing an evaluation value for each of the at least two options, each evaluation value being at least one of a sum and product of: a reciprocal of a distance between the detection corresponding position and the representative graphic, and a reciprocal of one of a size of the representative graphic and a size of the corresponding area, and
      (b) selecting the option from among the at least two options having a higher evaluation value.

\* \* \* \* \*